Feb. 3, 1942.    A. B. CONANT    2,271,792
MEANS FOR TREATING AIR
Filed Jan. 19, 1938
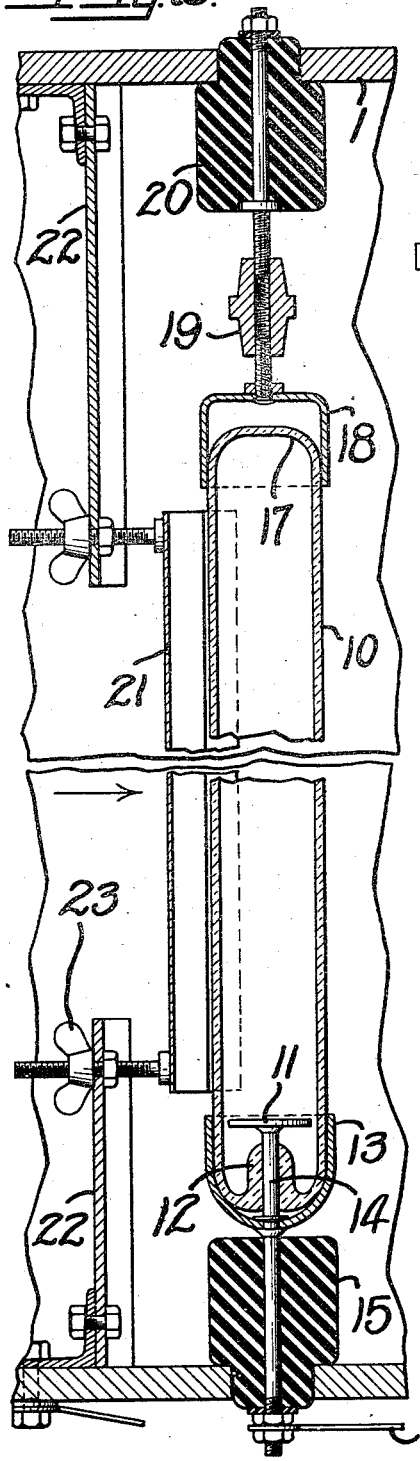
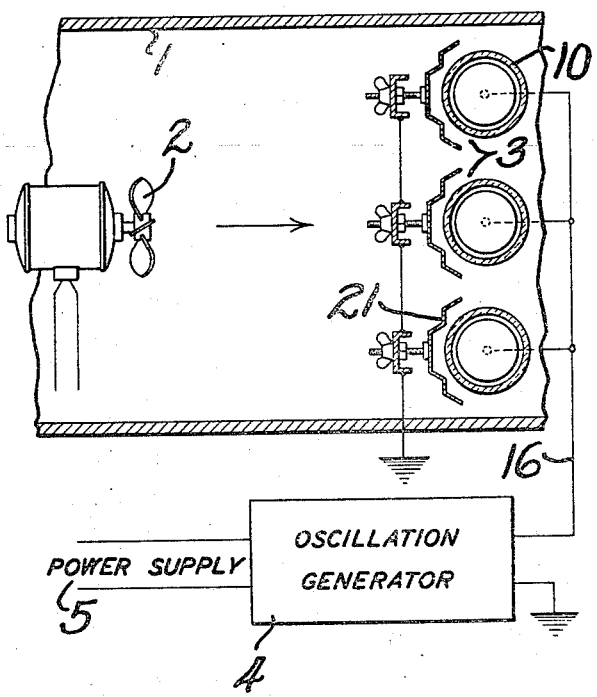
INVENTOR,
ALAN B. CONANT.
BY
Lippincott & Metcalf
ATTORNEYS.

UNITED STATES PATENT OFFICE 2,271,792

MEANS FOR TREATING AIR

Alan B. Conant, San Francisco, Calif., assignor to Montgomery Brothers, San Francisco, Calif., a copartnership Application January 19, 1938, Serial No. 185,736

10 Claims. (Cl. 21—74)

My invention relates to a means and method of treating air and more particularly to a means and method of treating air for the purposes of air-conditioning.

Among the objects of my invention are:

To provide a means and method of treating air to the end that the air may be purified by removal of impurities, such as organic and inorganic gases, atmospheric odors, etc.; to provide a means and method of applying specific types of radiation to air for use in air-conditioning; to provide a means and method of simultaneously treating air with a strong electric field and with light radiation; to provide a means and method of treating air with widely separate groups of electrical radiations; to provide a simple means and method of purifying air without resorting to the use of a brush discharge, or to the production of ozone; to provide a means and method of subjecting air to a low-frequency electric field and to a high-frequency light radiation; and to provide a simple and efficient means and method of activating air for the removal of impurities therein.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing, Fig. 1 is a sectional view through an air conduit wherein the device of my invention is installed.

Fig. 2 is a longitudinal sectional view of an activator unit embodying my invention.

It is well known in the art that irradiation of air by ultra-violet light produced in a gaseous discharge tube, either alone or in combination with a corona discharge producing ozone, is highly effective in the purification of air for air-conditioning purposes, probably because the oxygen of the air thus treated is rendered extremely chemically active, so that it will quickly oxidize odoriferous gases and render them non-odoriferous.

It has further been found that such a treatment in the presence of ozone freshens the air so treated, and at least imparts to the air thus treated, qualities which are highly desirable for air-conditioning of buildings.

The production of ozone, however, while rendering the air chemically active, is subject to one great disadvantage in that ozone itself is odoriferous. Ozone is possessed of a sharp and penetrating odor and thus it was necessary in prior devices to carefully control the amount of ozone produced, in order that the odor of the ozone should not overcome all the advantages gained by the activation of the air.

I have found, however, that air can be treated without the production of any substantial quantity of ozone, and that the air thus rendered active will be fully as active chemically or otherwise to remove odors and other organic and inorganic gases present, as if ozone itself were used as the active agent.

Broadly as to method, my invention comprises subjecting air, preferably while in transit for air-conditioning purposes, to an alternating electrical field, and simultaneously irradiating the air while under stress from said field with a spectrum having a large percentage below the visible range of light, preferably a spectrum produced from ionization of argon. This latter spectrum is relatively poor in wavelengths in the visible range and relatively rich in wavelengths below the visible range.

Broadly as to apparatus, my invention comprises in combination with a conduit through which air is passing, one or more activating units, each comprising a gaseous discharge tube having an auxiliary electrode adjacent but not touching the walls thereof, and means for passing a current through the gases in the tube, through the wall of the tube, and capacitatively across the gap between the wall of the tube and the auxiliary electrode, to the end that the air between the tube and the auxiliary electrode be electrically stressed, and at the same time be irradiated by light produced by current passing through the gas in the tube.

I prefer to utilize as a gas filling, argon, or a mixture of argon and air, either one of which when ionized will give a spectrum relatively high in the ultra-violet range.

My invention may be more fully understood by direct reference to the drawing wherein an air-conditioning conduit 1 represented diagrammatically, has an air stream therethrough created by a fan 2, or similar device. Positioned in the air stream across the conduit 1 are one or more activating units 3 energized preferably in parallel by oscillation generator 4 supplied from power source 5.

The detailed structure of the treating units is to be found in Fig. 2 wherein a tube envelope 10 of a material transmitting ultra-violet rays, such as quartz, or other special glasses made for the purpose, is provided at one end thereof with a single disc electrode 11 supported in the envelope by end seal 12. A base 13 is provided and connecting post 14 passes through the wall of the conduit, insulated therefrom by insulator 15. Connection to post 14 is made directly to high potential lead 16 of the oscillation generator 4. I prefer to use only a single internal electrode, the other end 17 of the envelope 10 being rounded and inserted in conductive end cap 18, which is adjustable along the tube by adjustment nut 19 supported by the opposite wall of conduit 1 on insulator 20. I prefer that conductive cap 18 not be directly connected to generator 4.

Adjacent a side wall of envelope 10 is an auxiliary electrode 21. This auxiliary electrode is in the form of a reflector slightly wider than the tube diameter and while adjacent is spaced from the side wall of envelope 10, and positioned, with relation to the air stream, so that the auxiliary electrode protects the tube from the direct impact of passing air. Auxiliary electrode 21 extends along the length of the envelope 10 between base 13 and end cap 18 and may be supported on extensions 22 from the conduit wall at each end thereof and is adjustable by means of auxiliary electrode screws 23. In this manner, the distance between envelope 10 and auxiliary electrode 21 may be carefully regulated. Auxiliary electrode 21 may be grounded to complete the circuit to generator 4.

The envelope 10 is preferably filled with a gas giving a high percentage of ultra-violet, and I have found a satisfactory gas filling to be a filling of argon at a pressure of 16 millimeters of mercury, or such a filling of argon mixed with atmospheric air. The latter, while adding a reddish tinge to the well-known argon spectrum, appears to add a useful amount of ultra-violet as well.

Generator 4 may be of the well-known electronic tube oscillator; it may be a high-frequency generator of a rotating type; it may be operated directly from alternating current mains by means of frequency multiplication; or may be any other type of generator which will give a supersonic alternating current. While I have utilized frequencies with perfectly satisfactory results from 15,000 cycles to 250,000 cycles per second, I am inclined to believe that the lower frequencies from 15,000 to 100,000 cycles per second give the best results from an empirical standpoint.

In operation, when generator 4 is energized, current is applied solely between internal electrode 11 and to external auxiliary electrode 21. The gas inside envelope 10 will be ionized, and a capacity will be formed between the ionized gas and the auxiliary electrode 21. A portion of the dielectric between the gas and electrode 21 will be the wall of the envelope 10, the remainder being the air between the wall of the tube and auxiliary electrode. An alternating discharge will then occur between electrodes 11 and 21 by virtue of the capacitance between the latter electrode and the gas column rendered conductive by ionization.

I prefer to so adjust electrode 21 with relation to the wall of the tube, that a high electrical strain will be set up in the air space therebetween, without the production of any substantial amount of corona, and consequently without the production of any substantial amount of ozone. I have found that from 30 to 50 milliamperes may be passed through the circuit without the production of ozone or corona discharge with proper ionization of the gas within envelope 10.

Under certain conditions and with certain gas fillings, the field distribution between internal electrode 11 and external electrode 21 may be such that the electrodeless end of the tube will not be fully ionized, and I may desire to provide end cap 18, adjustable along the end of the tube, although this is not necessary when tubes are standardized. The presence of isolated conductive end cap 18 by its capacity tends to correct field distortion within the tube, so that the gases may be entirely ionized. The cap may be adjusted until the proper ionization is obtained and then fixed in place.

Multiple activator units, as described, are inserted in the air stream in conduit 1 and are allowed to run continuously as the air passes by them. The tubes are protected from the direct impact of the air stream, thus reducing the liability of cracking and dust collection on the tube envelope. The air, as it passes through the conduit, is subject to two simultaneous treatments. The air as it eddies around the electrode 21 and the adjacent tube is subjected to the electrical field between the tube wall and the electrode 21, and at the same time it is being irradiated by the radiations from the tubes which are rich in ultra-violet.

Experiments have proven that such a treatment produces a highly activated air and as a consequence, odors and other objectionable gases are eliminated. It is my opinion that the treatment is of even greater efficiency, as far as power consumption is concerned, than if ozone were to be liberated in the quantities necessary for properly activating the air.

At any rate, the end result is that the outgoing air is highly purified, is fresh and zestful and has highly desirable qualities for use in ventilating systems.

For example, it will be obvious that activator units may be mounted directly in the container encompassing the air to be treated, and circulation of air obtained by naturally existing air currents within the container or by convection currents set up by the operation of the units themselves.

It will also be obvious that special auxiliary electrodes may be dispensed with and part or all of the conduit wall may be utilized in place thereof, to obtain the proper return path for the current energizing the tube. This may be done, for example, by arranging the tube lengthwise of the conduit and close to one wall thereof, or in certain cases concentric with the inner wall thereof when using a single tube.

It is to be distinctly understood that the example given herein is illustrative only, and that modifications for specific purposes within the scope of the claims are deemed full equivalents.

I claim:

1. Air-conditioning means comprising a tube of material transparent to ultra-violet light, a filling of gas giving ultra-violet light when ionized, an electrode adjacent and spaced from the wall of said tube, an alternating current generator, means for connecting the interior of said tube to said generator, means for creating a return path for said current through said wall and said electrode whereby said tube is illuminated and the air placed under an electrical strain between said wall and said electrode, and means for directing an air stream past said tube and electrode and within the influence of both, said electrode being supported independently of said tube and in the path of flow of said air toward the tube to shield said tube against full impact of said air.

2. Apparatus in accordance with claim 1 wherein the electrode shield is adjustably mounted on its independent support with respect to the tube to enable adjustment of the spacing between said electrode shield and the tube.

3. Air-conditioning means comprising a conduit, means for directing an air stream through said conduit, an elongated tube of material transparent to ultra-violet light supported in said conduit in the path of said air stream, a single electrode in said tube and at one end thereof, an exterior electrode supported in said conduit independently of said tube and extending along said tube, adjacent thereto and spaced therefrom at a point intermediate said air stream directing means and said tube to shield said tube from impact of said air stream, a filling of gas in said tube giving a spectrum when ionized rich in ultra-violet light, an alternating current generator, a connection from said generator to said single electrode, and a connection from said generator to said exterior electrode, said connections being the sole connections to energize said tube through the capacity between said tube and said exterior electrode.

4. Air-conditioning means comprising a conduit, an elongated tube of material transparent to ultra-violet light in said conduit, a single electrode in said tube and at one end thereof, an exterior electrode extending along said tube, adjacent thereto and spaced therefrom, a filling of gas in said tube giving a spectrum when ionized rich in ultra-violet light, an alternating current generator, a connection from said generator to said single electrode, a connection from said generator to said exterior electrode, said connections being the sole connections to energize said tube through the capacity between said tube and said exterior electrode and a conductive body on the outside of the electrodeless end of said tube and conductively separated from said generator for adjustment of the field within said tube.

5. Air-conditioning means comprising a conduit, an elongated tube of material transparent to ultra-violet light in said conduit, a single electrode in said tube and at one end thereof, an exterior electrode extending along said tube, adjacent thereto and spaced therefrom, a filling of gas in said tube giving a spectrum when ionized rich in ultra-violet light, an alternating current generator, a connection from said generator to said single electrode, a connection from said generator to said exterior electrode, said connections being the sole connections to energize said tube through the capacity between said tube and said exterior electrode and a conductive body on the outside of the electrodeless end of said tube and conductively separated from said generator, said body being movable on said tube for adjustment of the field within said tube.

6. Air treating apparatus comprising a conduit, a fan for directing an air stream through said conduit, a discharge tube having an electrode therein supported in said conduit in the path of said air flow, conductive means spaced from said tube for shielding said discharge tube against impact of said air flow over its surface, and means for applying an alternating potential between said conductive means and said electrode to excite said tube.

7. Air treating apparatus comprising a conduit, a fan for directing an air stream through said conduit, a discharge tube having an internal electrode supported in said conduit in the path of said air flow, and means for shielding said discharge tube against impact of said air flow over its surface, said shielding means comprising an auxiliary electrode supported in said conduit intermediate said fan and said tube and independently of said tube, said auxiliary electrode and said internal electrode being in electrical connection with a source of alternating potential to effect discharge operation of said tube.

8. Air treating apparatus comprising a conduit, a fan for directing an air stream through said conduit, an elongated discharge tube supported in said conduit in the path of said air flow, and means for shielding said discharge tube against impact of said air flow over its surface, said shielding means comprising a support anchored within the conduit, and a conductive shield carried by said support intermediate said fan and said tube but in close spaced relationship to said tube and wider than said tube to shield said tube against the impact of said airstream, said shield forming one energizing electrode for said tube.

9. Air treating apparatus comprising a conduit, a fan for directing an air stream through said conduit, a discharge tube supported in said conduit in the path of said air flow, and means for shielding said discharge tube against impact of said air flow over its surface, said shielding means comprising a pair of shield supporting bracket extensions anchored within the conduit in substantial alinement with each other, and a shield carried by said bracket extensions intermediate said fan and said tube but adjacent said tube to shield said tube against the impact of said airstream, said shield forming one energizing electrode for said tube.

10. Air treating apparatus comprising a conduit, a fan for directing an air stream through said conduit, a gaseous discharge tube supported in said conduit in the path of said air flow, and means for shielding said discharge tube against impact of said air flow over its surface, said shielding means comprising a pair of shield-supporting bracket extensions anchored within the conduit in substantial alinement with each other, and a shield carried by said bracket extensions intermediate said fan and said tube but in close spaced relationship to said tube and of said air stream, means for adjusting the spacing between said shield and said tube, said shield and the gas in said tube being in electrical connection with a source of alternating potential to effect discharge operation of said tube.

ALAN B. CONANT.